US008730512B2

(12) United States Patent
Yoshida et al.

(10) Patent No.: US 8,730,512 B2
(45) Date of Patent: May 20, 2014

(54) SCANNING LENS, OPTICAL SCANNING DEVICE AND IMAGE FORMING APPARATUS USING SAME

(71) Applicant: Kyocera Document Solutions Inc., Osaka (JP)

(72) Inventors: Shingo Yoshida, Osaka (JP); Issei Nakano, Osaka (JP); Hideki Okamura, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/772,381

(22) Filed: Feb. 21, 2013

(65) Prior Publication Data
US 2013/0222863 A1    Aug. 29, 2013

(30) Foreign Application Priority Data

Feb. 24, 2012 (JP) .................................. 2012-038179
Aug. 24, 2012 (JP) .................................. 2012-185108

(51) Int. Cl.
*H04N 1/04*       (2006.01)
(52) U.S. Cl.
USPC .......... 358/1.15; 358/474; 358/497; 358/498; 358/481
(58) Field of Classification Search
USPC .......................... 358/1.15, 481, 474, 497, 498
See application file for complete search history.

(56) References Cited

U.S. PATENT DOCUMENTS

| 8,228,580 B2* | 7/2012 | Arai et al. ................... 359/204.1 |
| 2008/0158331 A1 | 7/2008 | Kato |
| 2010/0141730 A1 | 6/2010 | Kato |
| 2010/0309516 A1* | 12/2010 | Naito ........................... 358/1.15 |
| 2011/0116148 A1 | 5/2011 | Kato |
| 2011/0216151 A1 | 9/2011 | Kato |
| 2011/0216152 A1 | 9/2011 | Kato |
| 2012/0188624 A1 | 7/2012 | Kato |

FOREIGN PATENT DOCUMENTS

JP          8-76011        3/1996

* cited by examiner

*Primary Examiner* — Houshang Safaipour
(74) *Attorney, Agent, or Firm* — Gerald E. Hespos; Michael J. Porco; Matthew T. Hespos

(57) ABSTRACT

An optical scanning device includes a light source which emits a light beam, a deflector, an incident optical system and one scanning lens. The deflector reflects and deflects/scans the light beam emitted from the light source. The scanning lens includes a first face facing the deflector and a second face on an opposite side to the first face, and performs imaging of the deflected/scanned light beam on a surface to be scanned. In a main scanning cross section, when an angle relative to an optical axis of an incident light beam which enters the scanning lens from the first face is θin, and an angle relative to an optical axis of an outgoing light beam which is output from the second face toward the surface to be scanned is θout, in an entire scanning region, a condition of 0.9<θin/θout<1.3 is satisfied.

8 Claims, 8 Drawing Sheets

SCANNING LENS, OPTICAL SCANNING DEVICE AND IMAGE FORMING APPARATUS USING SAME

This application relates to and claims priority from Japanese Patent Application No. 2012-38179, filed in the Japan Patent Office on Feb. 24, 2012, and from Japanese Patent Application No. 2012-185108, filed in the Japan Patent Office on Aug. 24, 2012, the entire disclosure of which is incorporated herein by reference.

BACKGROUND

The present disclosure relates to an optical scanning device including a scanning lens which performs, on a surface to be scanned, imaging of a light beam that was deflected and scanned, and an image forming apparatus using the foregoing optical scanning device.

For example, a general optical scanning device that is used, for example, in laser printers and copiers includes a light source which emits a laser beam, a polygon mirror which reflects and deflects/scans the laser beam, and a scanning lens which performs imaging of the deflected/scanned laser beam on a peripheral surface (surface to be scanned) of a photoreceptor drum. As the scanning lens, a lens having a distortion (fθ characteristics) in which the angle of the incident light and the height of the image become a proportional relation is used. Moreover, the foregoing scanning lens is generally manufactured by molding a resin material in a metal mold.

While the scanning lens is sometimes configured from a plurality of lenses, it is also sometimes configured from one lens for the purpose of downsizing the device or reducing costs. As conventional technology, in an optical scanning device in which the scanning lens is configured from one lens, known is design technology of defining the relation of the entrance face and the exit face of the scanning lens in a main scanning direction cross section. Specifically, when a curvature radius near an optical axis of the entrance face facing the polygonal mirror is R1 and a curvature radius near an optical axis of the exit face is R2, the scanning lens is configured from a meniscus lens which is convex on the polygon mirror side and which satisfies a relationship of 0<R1<R2.

Nevertheless, upon using the scanning lens of the optical scanning device according to the foregoing conventional technology, there is a problem in that the optical performance is unstable, or the productivity is inferior. In other words, when the scanning lens satisfies the relationship of 0<R1<R2, the thickness of the scanning lens in the optical axis direction will become thinner from the center part to the end part in the main scanning direction. When a scanning lens having this kind of thin part is manufactured by molding, the shape tends to vary slightly in each molding process. Thus, the optical performance among the molded scanning lenses becomes unstable. This problem can be resolved by extending the cast molding time and the cooling time in the molding process. Nevertheless, a problem regarding the deterioration in productivity will naturally arise.

An object of the present disclosure is to stabilize the optical performance of the scanning lens.

SUMMARY

The optical scanning device according to one aspect of the present disclosure is an optical scanning device which includes a light source which emits a light beam, a deflector, an incident optical system and one scanning lens. The deflector reflects and then deflects/scans the light beam emitted from the light source. The incident optical system causes the light beam emitted from the light source to enter the deflector. The scanning lens includes a first face facing the deflector and a second face on an opposite side to the first face, and performs imaging of the deflected/scanned light beam on a surface to be scanned. In a main scanning cross section, when an angle relative to an optical axis of an incident light beam which enters the scanning lens from the first face is θin, and an angle relative to an optical axis of an outgoing light beam which is output from the second face toward the surface to be scanned is θout, in an entire scanning region, a condition of 0.9<θin/θout<1.3 is satisfied.

The image forming apparatus according to another aspect of the present disclosure includes an image carrier which carries an electrostatic latent image, and an optical scanning device which irradiates a light beam with a peripheral surface of the image carrier as the surface to be scanned, wherein the optical scanning device includes the foregoing configuration.

DETAILED DESCRIPTION

Figure 1:
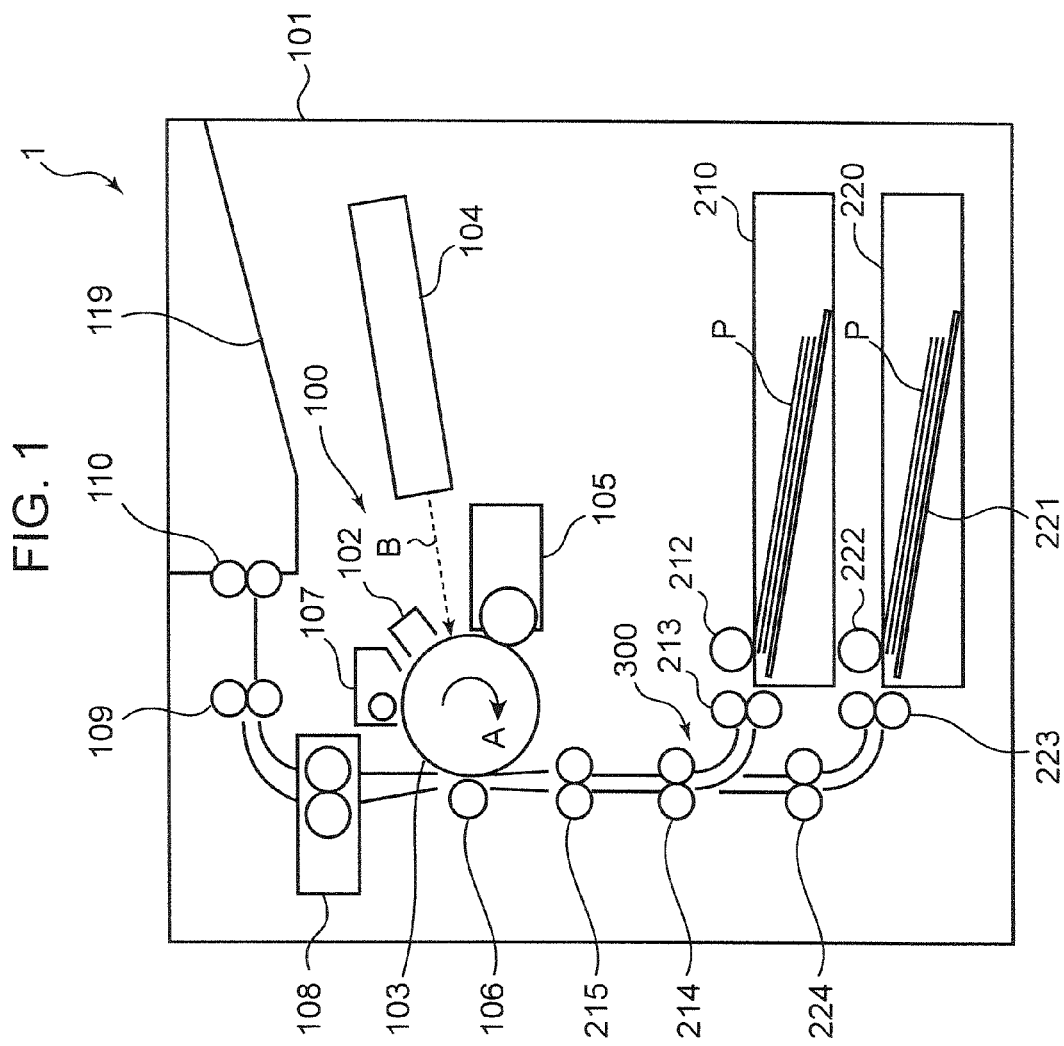
FIG. 1 is a cross sectional view showing the schematic configuration of the printer according to one embodiment of the present disclosure.

The optical scanning device according to one embodiment of the present disclosure is now explained with reference to the appended drawings. FIG. 1 is a cross sectional view showing the schematic configuration of a printer 1 (example of an image forming apparatus) according to one embodiment of the present disclosure. Note that the image forming apparatus is not limited to the printer 1, and may also be a copier, a facsimile, a multi-function machine or the like. The printer 1 includes a box-shaped housing 101, and an image forming unit 100, an optical scanning device 104, and paper feeding cassettes 210, 220 housed in the housing 101. The paper feeding cassettes 210, 220 are detachably mounted on a bottom part of the printer 1.

The image forming unit 100 performs processing of forming a toner image on a sheet, and includes a charging device 102, a photoreceptor drum 103 (image carrier), a developing device 105, a transfer roller 106, a cleaning device 107, and a fixing unit 108.

The photoreceptor drum 103 is a cylindrical member, and an electrostatic latent image and a toner image are formed on a peripheral surface thereof. The photoreceptor drum 103 receives drive force from a motor not shown, and is rotated in a clockwise direction shown with an arrow A in FIG. 1. The charging device 102 substantially uniformly charges the surface of the photoreceptor drum 103.

The developing device 105 supplies a toner to the peripheral surface of the photoreceptor drum 103, on which an electrostatic latent image was formed, and thereby forms a toner image. The developing device 105 includes a developing roller for carrying the toner, and a screw for agitating and delivering the toner. The toner image formed on the photoreceptor drum 103 is transferred to a sheet that is fed from the paper feeding cassettes 210, 220 and delivered to a feeding path 300. The toner is supplied to the developing device 105 from a toner container not shown.

The transfer roller 106 is disposed facing a lateral side of the photoreceptor drum 103, and a transfer nip portion is formed by the transfer roller 106 and the photoreceptor drum 103. The transfer roller 106 is configured from a rubber material with conductivity and provided with a transfer bias, and transfers the toner image formed on the photoreceptor drum 103 to the sheet. The cleaning device 107 cleans the peripheral surface of the photoreceptor drum 103 after the toner image is transferred.

The fixing unit 108 includes a fixing roller with a heater build therein, and a pressure roller provided at a position facing the fixing roller. The fixing unit 108 fixes the toner image, which was transferred to a sheet, on the sheet while conveying and heating the sheet with the toner image formed thereon with the rollers.

The optical scanning device 104 forms an electrostatic latent image by irradiating a laser beam according to image data that is input from external equipment such as a personal computer to the peripheral surface (surface to be scanned) of the photoreceptor drum 103 that was substantially uniformly charged by the charging device 102. The optical scanning device 104 will be described in detail later.

The paper feeding cassettes 210, 220 house a plurality of sheets P to which images are to be formed. A feeding path 300 for delivering the sheets is disposed between the paper feeding cassettes 210, 220 and the image forming unit 100. The feeding path 300 is provided with paper feed roller pairs 213, 223, transport roller pairs 214, 224, and a resist roller pair 215. Moreover, disposed on the downstream side of the fixing unit 108 are a transport roller pair 109, and a discharge roller pair 110 for discharging the sheets to the paper discharge tray 119.

The image forming operation of the printer 1 is now briefly explained. Foremost, the peripheral surface of the photoreceptor drum 103 is substantially uniformly charged with the charging device 102. The charged peripheral surface of the photoreceptor drum 103 is exposed by a laser beam emitted from the optical scanning device 104, and an electrostatic latent image of the image to be formed on the sheet P is formed on the peripheral surface of the photoreceptor drum 103. The electrostatic latent image is developed as a toner image as a result of the toner being supplied from the developing device 105 to the peripheral surface of the photoreceptor drum 103. Meanwhile, the sheet P is fed from the paper feeding cassettes 210, 220 to the feeding path 300 by the pickup rollers 212, 222, and delivered to the transport roller pairs 214, 224. Subsequently, the sheet P is once stopped by the resist roller pair 215, and delivered to the transfer nip portion between the transfer roller 106 and the photoreceptor drum 103 at a predetermined timing. The toner image is transferred to the sheet P as a result of the sheet P passing through the transfer nip portion. After the foregoing transfer operation, the sheet P is delivered to the fixing unit 108, and the toner image is fixed to the sheet P. Subsequently, the sheet P is discharged to the paper discharge tray 119 by the transport roller pair 109 and the discharge roller pair 110.

Figure 2:
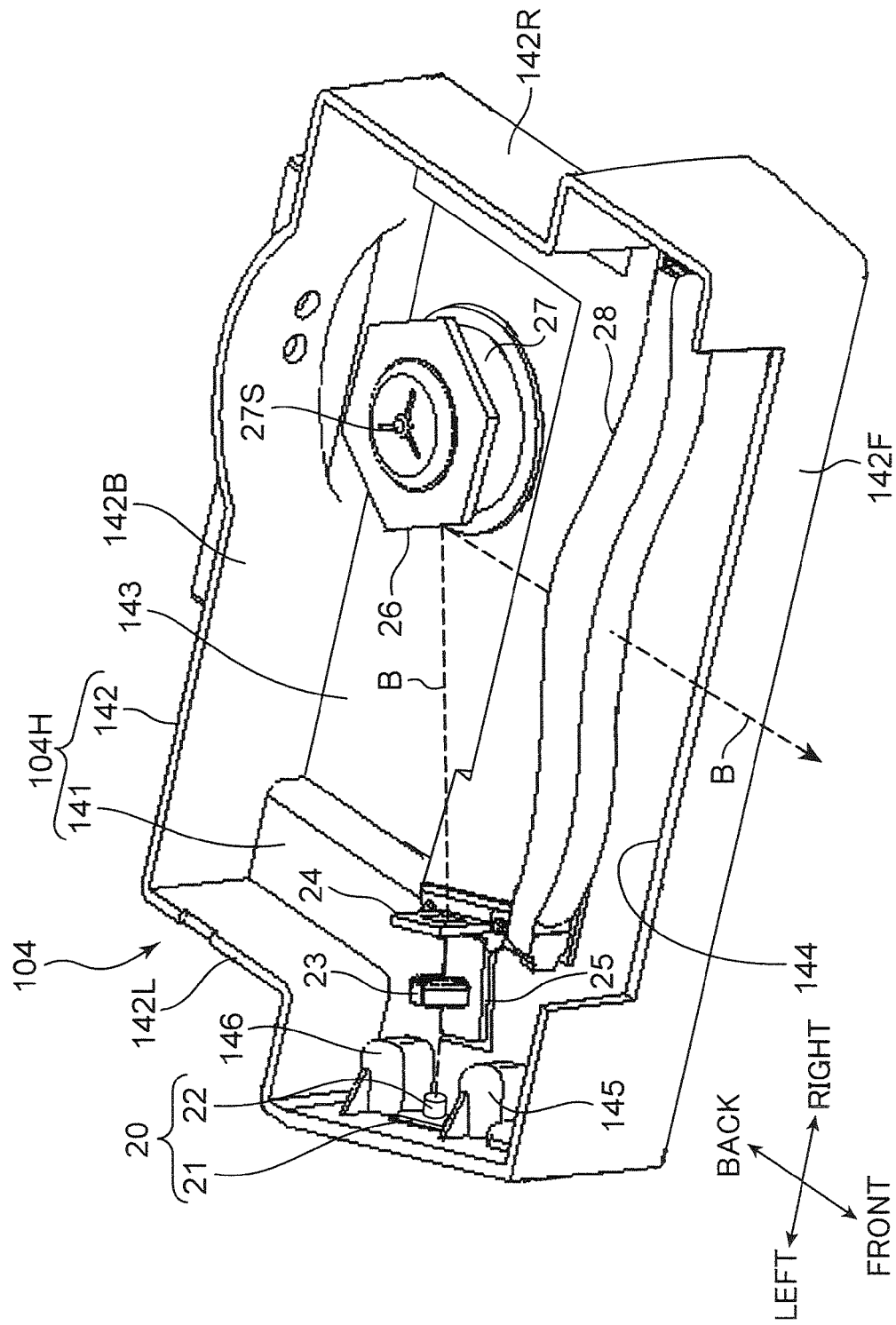
FIG. 2 is a perspective view showing the internal structure of the optical scanning device according to an embodiment.
Figure 3:
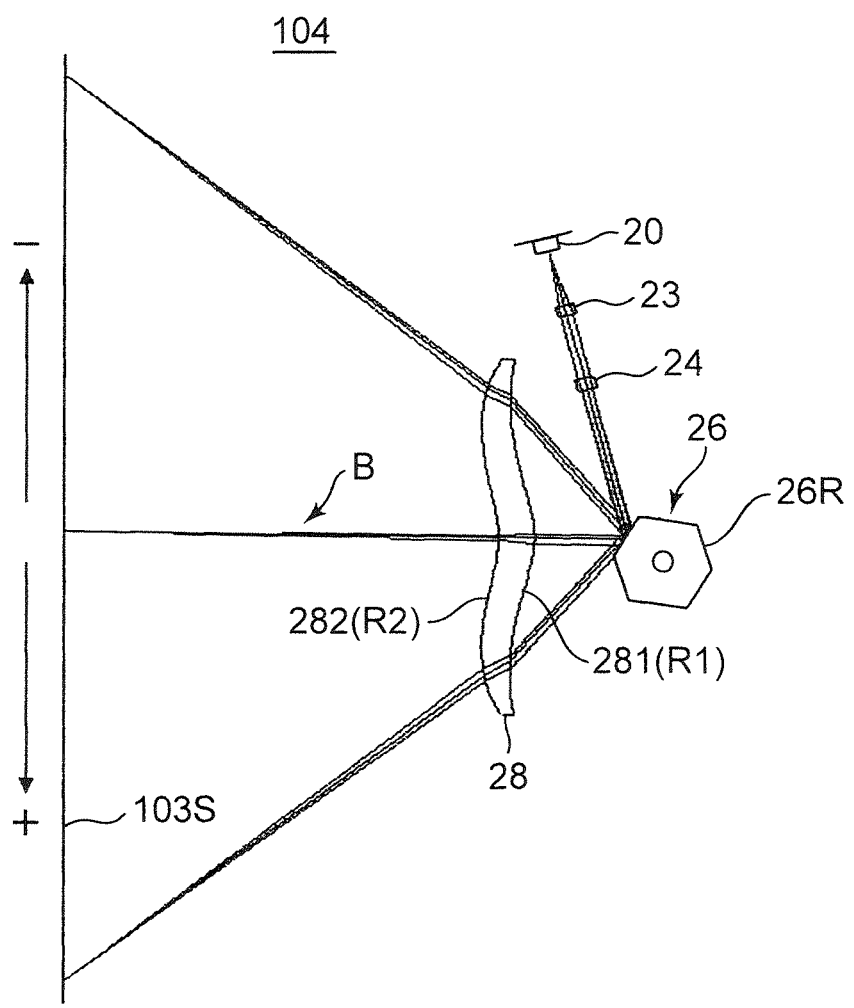
FIG. 3 is a light path diagram showing the configuration of the optical scanning device in the main scanning cross section.

The detailed structure of the optical scanning device 104 according to this embodiment is now explained. FIG. 2 is a perspective view showing the internal structure of the optical scanning device 104, and FIG. 3 is a light path diagram showing the configuration of the optical scanning device 104 in the main scanning cross section. The optical scanning device 104 includes a housing 104H, and a laser unit 20 (light source), a collimator lens 23 (part of the incident optical system), a cylindrical lens (part of the incident optical system), a polygon mirror 26 (deflector), and a fθ lens 28 (scanning lens) housed in the housing 104H. In the indication of directions shown in FIG. 2, the left-right direction is the main scanning direction. The optical scanning device 104 of this embodiment is an optical scanning device in which the scanning lens is configured from only one lens (fθ lens 28).

The housing 104H includes a bottom plate 141 as a base member on which various members are mounted, side plates 142 that are erected substantially vertically from the peripheral edges of the bottom plate 141, and a cover for covering the upside of the side plates 142. Note that, in FIG. 2, since a state where the cover has been removed is shown, the cover is not indicated. The housing 104H has a substantially square shape when viewed from the top face. The side plates 142 include a front side plate 142F which faces a peripheral surface 103S of the photoreceptor drum 103 when the optical scanning device 104 is mounted on the printer 1, a rear side plate 142B which faces the front side plate 142F, and a right side plate 142R and a left side plate 142L which connect both sides of the front side plate 142F and the rear side plate 142B.

The bottom plate 141 is provided with a recess 143 at a location which is adjacent to the rear side plate 142B and which has a height that is lower than its surroundings. A polygon mirror 26 is disposed in the recess 143, and the laser unit 20, the collimator lens 23, the cylindrical lens 24 and the fθ lens 28 are disposed in a region other than the recess 143 of the bottom plate 141. The front side plate 142F is provided with a window part 144 which is formed by notching the front side plate 142F from the upper edge up to around the intermediate portion thereof. Even in a state where the cover (not shown) is mounted, the window part 144 remains an opening of the housing 104H. Moreover, a first holding member 145 and a second holding member 146 are provided on a top face of the bottom plate 141 near the left side plate 142L. A minute gap is provided between the left side plate 142L and the first holding member 145, and between the left side plate 142L and the second holding member 146, respectively.

The laser unit 20 includes a substrate 21, and a substantially cylindrically shaped semiconductor laser 22 mounted on one face of the substrate 21. The semiconductor laser 22 is a light source which emits a laser beam (light beam) of a predetermined wavelength. Mounted on the substrate 21 are a semiconductor laser 22, and a drive circuit component for driving the semiconductor laser 22. The laser unit 20 is mounted on the top face of the bottom plate 141 such that the substrate 21 is sandwiched in the gap formed between the first holding member 145 and the left side plate 142L and the gap formed between the second holding member 146 and the left side plate 142L respectively, and such that the semiconductor laser 22 is fitted between the first holding member 145 and the second holding member 146. The irradiation position of the laser beam B can be adjusted by adjusting the position that the substrate 21 is fitted into the gap.

The collimator lens 23 converts the laser beam B, which is emitted from the semiconductor laser 22 and diffused, into parallel light or light that is close to parallel. The collimator lens 23 is fixed to the bottom plate 141 with an adhesive using a base part 25.

The cylindrical lens 24 converts the parallel light into linear light that is long in a main scanning direction, and performs imaging of the linear light on a reflecting surface of the polygon mirror 26. The collimator lens 23 and the cylindrical lens 24 are an incident optical system which causes the laser beam B to enter the polygon mirror 26, and in this embodiment is configured from an oblique-incident optical system.

Here, desirably, an optical diffractive surface is provided to at least one face of either the entrance face or the exit face of the cylindrical lens 24. As an example, used may be a cylindrical lens in which the entrance face includes a cylindrical face (refractive part) curved in an arc, and the exit face has a diffractive surface formed thereon. The optical diffractive surface is desirably a flannel diffraction grating having a shape that does not have power in the main scanning direction. It is thereby possible to prevent the change in the diffraction effect caused by the temperature change from affecting the main scanning direction.

The fθ lens 28 is formed via resin molding as described later. In the foregoing case, when the ambient temperature changes, the refractive index of the fθ lens 28 also changes, and the focal position will consequently move. Moreover, the semiconductor laser 22 generally has temperature characteristics and, when the ambient temperature changes, the emission wavelength will change and cause the focal position to change. As a result of providing the optical diffractive surface of the cylindrical lens 24, it is possible to use the change in the emission wavelength caused by the change in the ambient temperature, and inhibit (correct) the movement of the focal position associated with the change in the lens refractive index caused by the change in the ambient temperature.

The explanation is continued with respect to this point. Let it be assumed that the ambient temperature of the optical scanning device 104 rose by dt. Based on this temperature rise, the refractive index n of lenses such as the fθ lens 28 will change by dn/dt, and the consequential focal distance change $d\phi I$ can be represented as the function of the refractive index of Formula (A) below. Note that L(n) is a coefficient of converting the refractive index change rate relative to the temperature rise into the focal distance change, and the refractive index n is a function.

$$d\phi I = L(n) dn/dt \quad (A)$$

Meanwhile, based on the temperature rise dt the oscillation wavelength λ of the semiconductor laser 22 will also change by dλ/dt. A focal distance change $d\phi L$ of the refraction and a focal distance change $d\phi L$, $d\phi D$ of the diffraction associated with this temperature rise dt can both be represented as the wavelength function by using Formula (B) and Formula (C) below. Here, coefficients Lw(λ) and Dw(λ) for converting the change rate of the oscillation wavelength λ relative to the temperature rise dt into the focal distance change are the wavelength functions.

$$d\phi L = Lw(\lambda) d\lambda/dt \quad (B)$$

$$d\phi D = Dw(\lambda) d\lambda/dt \quad (C)$$

The diffraction grating configuring the optical diffractive surface of the cylindrical lens 24 is designed to satisfy Formula (D) below. As a result of using the diffraction grating which satisfies Formula (D) below, the scaling change and focus change in the sub scanning direction caused by the environmental change (temperature rise dt) are set off by the focal distance change based on the refraction and diffraction of the diffraction grating. Accordingly, it is possible to inhibit the change in the focal position caused by the change in the ambient temperature.

$$d\phi I + d\phi L + d\phi D \approx 0 \quad (D)$$

The polygon mirror 26 is a polygonal mirror in which a reflecting surface 26R is formed along each side of a regular hexagon. A rotating axis 27S of the polygon motor 27 is connected to the center position of the polygon mirror 26. The polygon mirror 26 rotates around the rotating axis 27S as a result of the polygon motor 27 being rotatively driven, and deflects and scans the laser beam B which is emitted from the semiconductor laser 22 and imaged via the collimator lens 23 and the cylindrical lens 24.

The fθ lens 28 is a lens having fθ characteristics, and is a lens that is elongated in the main scanning direction. The fθ lens 28 is disposed between the window part 144 and the polygon mirror 26. The laser beam B reflected off the polygon mirror 26 is condensed by the fθ lens 28, and performs imaging on the peripheral surface 103S of the photoreceptor drum 103 through the window part 144 of the housing 104H. The fθ lens 28 is manufactured by molding a translucent resin material in a metal mold.

Referring to FIG. 3, the fθ lens 28 includes an entrance face 281 (first face) which faces the polygon mirror 26 and to which the laser beam B enters, and an exit face 282 (second face) which is a face on a side that is opposite to the entrance face 281 and from which the laser beam B exits. The light beam emitted from the laser unit 20 is reflected by the reflecting surface 26R of the polygon mirror 26 via the incident optical system configured from the foregoing collimator lens 23 and the cylindrical lens 24, and thereafter enters the entrance face 281 of the fθ lens 28. Subsequently, the light beam is output from the exit face 282 and heads toward the drum peripheral surface 103S. Pursuant to the rotation of the polygon mirror 26, the laser beam B scans the drum peripheral surface 103S from an off-axis minus (−) direction toward an off-axis plus (+) direction in the scanning region.

Figure 4:
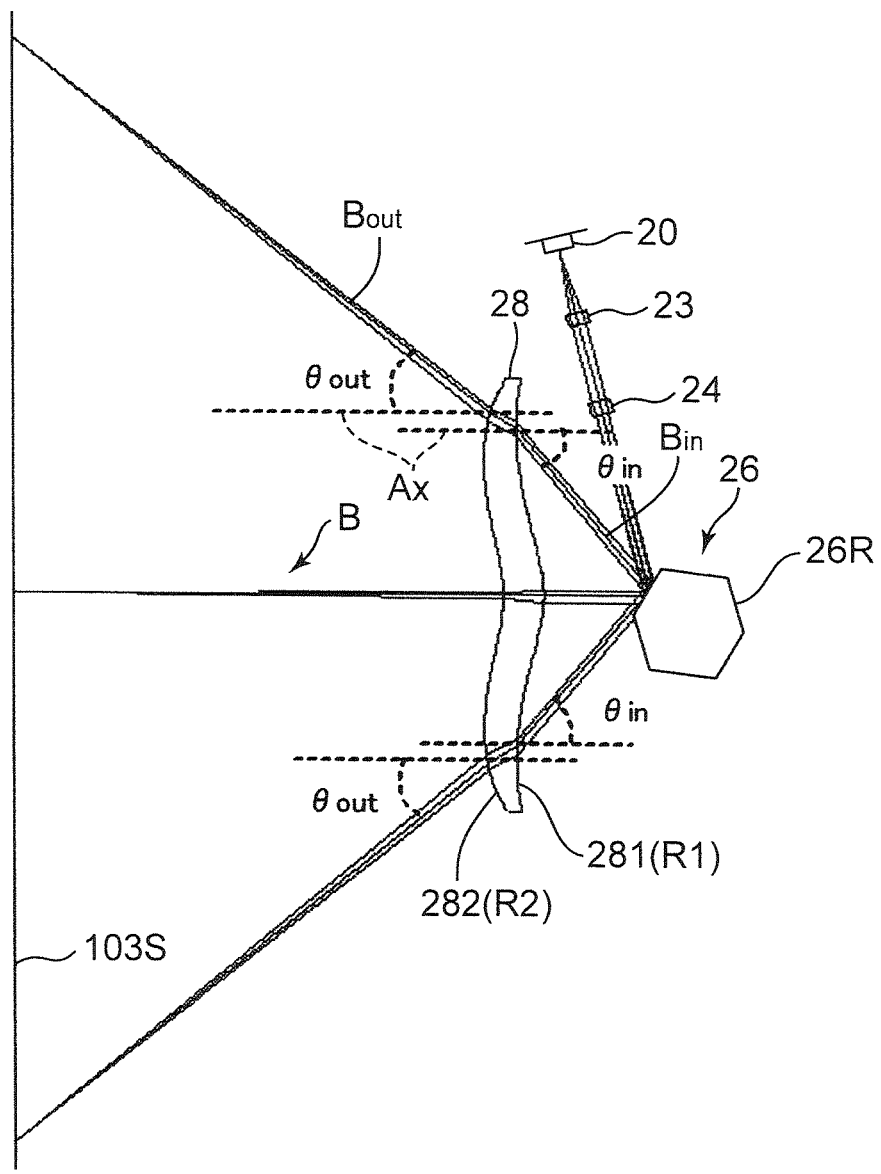
FIG. 4 is a diagram explaining the angle of the light beam that enters the scanning lens and the light beam that is output from the scanning lens relative to the optical axis.

In this kind of the fθ lens 28, a devisal for causing the thickness of the fθ lens 28 in the optical axis direction to be substantially uniform in the main scanning direction is provided in this embodiment. This point is now explained with reference to FIG. 4. In the main scanning cross section of the fθ lens 28, an angle relative to the axis Ax which is parallel to the optical axis of the incident light beam Bin that enters the fθ lens 28 from the entrance face 281 is set as θin, and an angle relative to the axis Ax which is parallel to the optical axis of the outgoing light beam Bout that is output from the exit face 282 toward the drum peripheral surface 103S is set as θout. In addition, in the entire region of the scanning region, the face shape of the entrance face 281 and the exit face 282 is defined so as to satisfy the conditions of following Formula (1).

$$0.9 < \theta in/\theta out < 1.3 \quad (1)$$

According to the foregoing configuration, as a result of θin/θout satisfying the conditions of foregoing Formula (1) in the entire region of the scanning region, it is possible to prevent the lens thickness in the optical axis direction of the fθ lens 28 in the main scanning cross section from becoming thin at the lens end part. Consequently, it will not be necessary to considerably change, in the main scanning direction, the thickness of the fθ lens 28 in the optical axis direction. In other words, the thickness of the fθ lens 28 can be made to be substantially uniform in the main scanning direction. Accordingly, it will be possible to stably mold the fθ lens 28 and reduce optical performance variation between lots.

Note that, if the uniformity of the lens thickness of the fθ lens 28 is to be given top priority, θin/θout=1 should be adopted. For example, while the entrance face 281 is given curvature, the exit face 282 is formed as a flat surface. However, this kind of fθ lens 28 entails a problem in that it is difficult to minimize the lens and to obtain favorable optical performance across the entire scanning region. Accordingly, in this embodiment, the curvature radius R1 of the entrance face 281 and the curvature radius R2 of the exit face 282 are mutually different.

Figure 5:
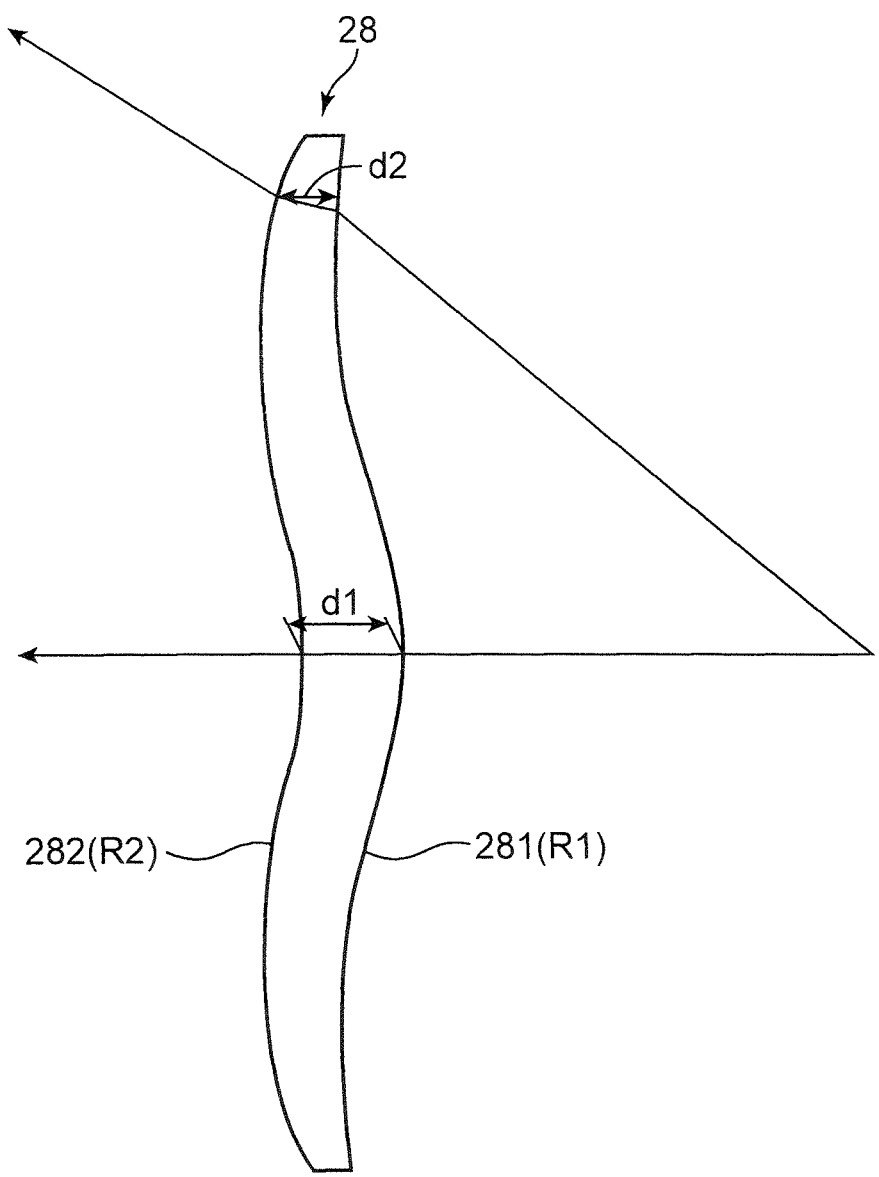
FIG. 5 is a plan view of the scanning lens.

However, even if the curvature radiuses R1, R2 are different, the curvature radiuses R1, R2 are selected such that the thickness of the fθ lens 28 in the optical axis direction will not become considerably thin at the end part in the main scanning direction. Referring to FIG. 5, when a lens thickness in an optical axis direction at a center of the fθ lens 28 in a main scanning direction is d1, and a lens thickness of an optical axis direction at an end part in a main scanning direction is d2, the face shape of the entrance face 281 and the exit face 282 is desirably selected so as to satisfy the conditions of Formula (2) below.

$$d2 > 0.7 \cdot d1, \text{ provided that } d2 \leq d1 \quad (2)$$

As a result of satisfying foregoing Formula (2), the lens thickness difference between the center and end part in the main scanning direction will decrease, and the productivity of the scanning lens can be further improved.

Example 1

An example of the construction date of the scanning optical system which satisfies the requirements of the optical scanning device 104 according to the foregoing embodiments is shown as Example 1. The imaging optical system of Example 1 is configured, as shown in FIG. 3, in order from the semiconductor laser 22 side, from one collimator lens 23, one cylindrical lens 24, and one fθ lens 28 configured from a meniscus lens that is convex on the drum peripheral surface 104S side. Moreover, the optical performance of the respective lenses of Example 1 and the face shape of the fθ lens 28 are as per Table 1.

TABLE 1

| Collimator Lens | | Cylindrical Lens | |
|---|---|---|---|
| f | 18 | f | 50 |
| Fb | 330 | n | 1.48 |
| n | 1.51 | | |

| fθ Lens | | | |
|---|---|---|---|
| f | 373 | Polygon-fθ distance | 24.5 |
| n | 1.5 | fθ-field distance | 117.51 |
| d | 9 | | |

| Main Scanning | | Sub Scanning | |
|---|---|---|---|
| R1 | | | |
| Rm | 24.2946 | Rs0 | −9.079E+00 |
| Ky | −8.814E+00 | Kx | 0 |
| A3 | −1.756E−06 | B1 | 1.764E−02 |
| A4 | −3.986E−06 | B2 | −2.300E−02 |
| A5 | 9.606E−10 | B3 | −5.379E−05 |
| A6 | 6.818E−10 | B4 | −1.740E−04 |
| A7 | 0.000E+00 | B5 | 5.086E−08 |
| A8 | 8.998E−15 | B6 | 4.597E−07 |
| A9 | 0.000E+00 | B7 | −1.721E−10 |
| A10 | −1.144E−17 | B8 | −1.135E−09 |
| | | B10 | 8.189E−13 |
| R2 | | | |
| Rm | 22.8421 | Rs0 | −7.245E+00 |
| Ky | −7.862E+00 | Kx | −6.966E−01 |
| A3 | 1.065E−06 | B1 | 3.802E−03 |
| A4 | −3.173E−06 | B2 | −1.382E−02 |
| A5 | −1.308E−11 | B3 | −2.487E−05 |
| A6 | 3.685E−10 | B4 | 2.453E−06 |
| A7 | 0.000E+00 | B5 | 1.278E−08 |
| A8 | −8.602E−14 | B6 | 8.940E−10 |
| A9 | 0000E+00 | B7 | −1.616E−12 |
| A10 | −1.224E−17 | B8 | 7.403E−13 |
| | | B10 | −1.853E−16 |

In Table 1, Fb represents the back focus of the collimator lens 23. "Polygon-fθ distance" represents the distance between the entrance face 281 of the fθ lens 28 and the reflecting surface 26R of the polygon mirror 26, and "fθ-field distance" represents the distance between the exit face 282 of the fθ lens 28 and the peripheral surface 103S of the photoreceptor drum 103, respectively. Note that the unit of f, Fb, d, "Polygon-fθ distance", and "fθ-field distance" in Table 1 is millimeters. Moreover, in Table 1, "R1" column represents the face shape of the entrance face 281 of the fθ lens 28, and "R2" column represents the face shape of the exit face 282 of the fθ lens 28, respectively. Note that Rm represents the main scanning curvature radius, Rs0 represents the sub scanning curvature radius, Ky represents the main scanning Korenich coefficient, Kx represents the sub scanning Korenich coefficient, and An and Bn (n is an integer) represent the high order coefficients of the face shape. By way of reference, in this Example, the main scanning curvature radius (R1) of the entrance face 281 of the fθ lens 28=24.29 mm, and the main scanning curvature radius (R2) of the exit face 282 of the fθ lens 28=22.84 mm, and a relation of 0<R2<R1 is satisfied. Needless to say, the relation of 0<R2<R1 is not an essential requirement, and it will suffice so as long as the conditions of foregoing Formula (1) are satisfied.

The face shape of the entrance face 281 and the exit face 282 is defined based on the following formula showing the sag amount by using a local orthogonal coordinate system (x, y, z) with the face vertex as the origin and the direction of heading toward the peripheral surface 103S as the positive direction of the z axis. Note that, Zm (main scanning direction) and Zs (sub scanning direction) are the displacement (face vertex reference) in the z axis direction at the position of height Y, Y is the height ($Y^2=x^2+y^2$) in a direction that is vertical to the z axis, Cm=1/Rm, and Cs=1/Rs.

Sag amount $$Sag = Zm + Zs$$

$$Zm = \frac{Cm \cdot Y^2}{1 + \sqrt{(1 - (1 + Ky)Cm^2 \cdot Y^2)}} +$$
$$A3 \cdot Y^3 + A4 \cdot Y^4 + A5 \cdot Y^6 + A6 \cdot Y^6 + A8 \cdot Y^8 + A10 \cdot Y^{10}$$

$$Rs = Rs0 + B1 \cdot Y + B2 \cdot Y^2 + B3 \cdot Y^3 + B4 \cdot Y^4 +$$
$$B5 \cdot Y^5 + B6 \cdot Y^6 + B7 \cdot Y^7 + B8 \cdot Y^8 + B10 \cdot Y^{10}$$

-continued $$Zs = \frac{Cs \cdot X^2}{1 - \sqrt{(1 - (1 + Kx)Cs^2 \cdot X^2)}}$$

Figure 6:
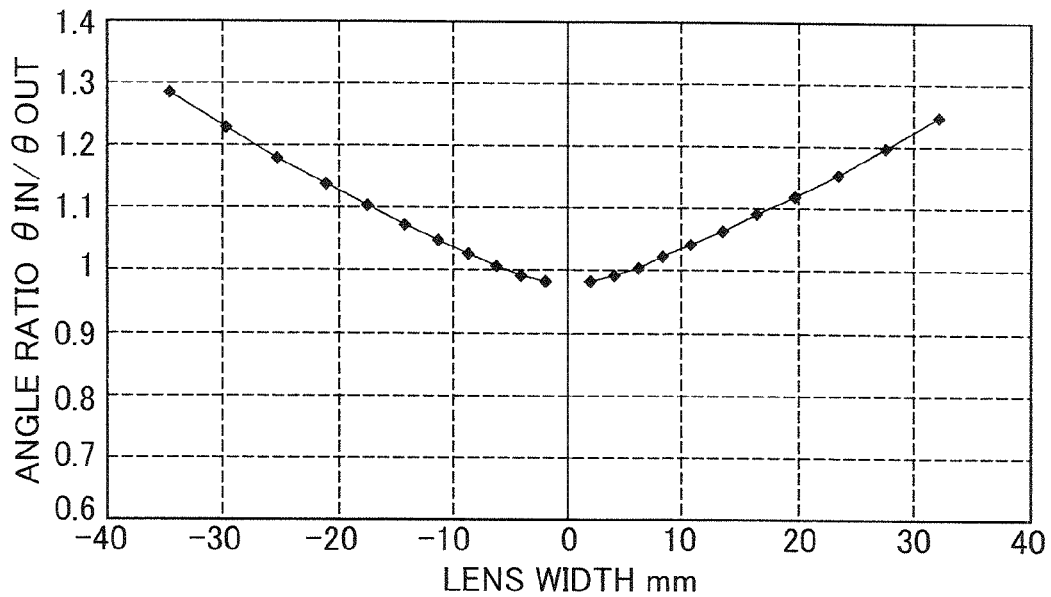
FIG. 6 is a graph showing the change of θin/θout of the scanning lens of the Example in the main scanning cross section.
Figure 7:
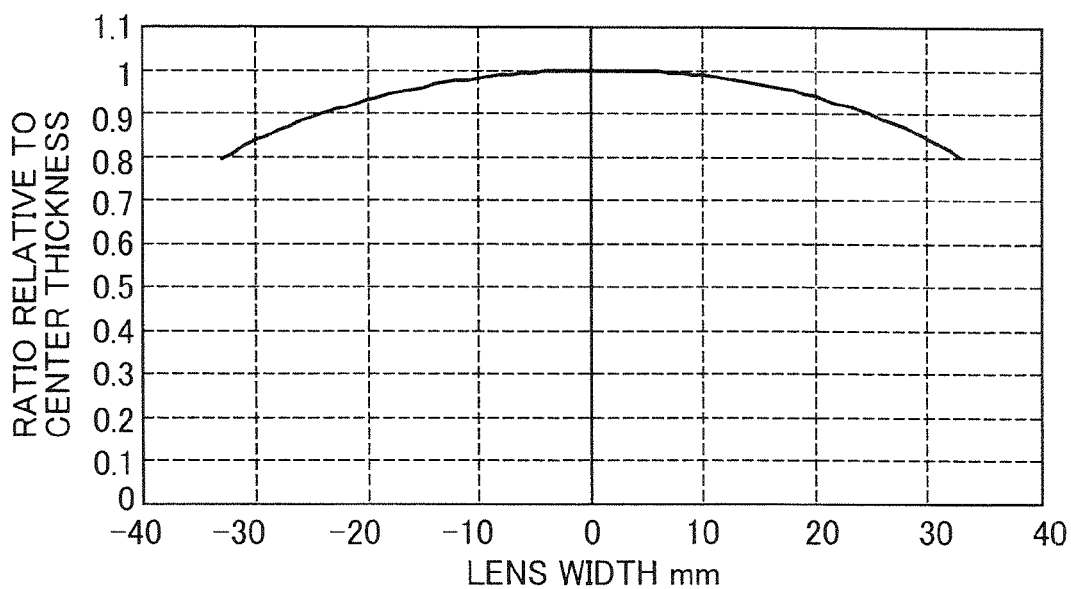
FIG. 7 is a graph showing the ratio of the scanning lens of the Example in the lens width direction relative to the center thickness.

FIG. 6 is a graph showing the value of the angle ratio θin/θout in the respective imaged heights of the fθ lens 28 of foregoing Example 1. As evident from FIG. 6, θin/θout is within the range of foregoing Formula (1) across the entire scanning region. FIG. 7 is a graph showing the ratio of the lens thickness of the fθ lens 28 of Example 1 in the respective imaged heights relative to the lens thickness in the optical axis direction at the center of the fθ lens 28 in the main scanning direction. As a result of the θin/θout being set within the range of foregoing Formula (1), the ratio of the thickness of the lens center part and the thickness of the lens end part is inhibited to be 0.78 or more, and it can be understood that the an fθ lens with a small lens thickness change has been obtained.

Figure 8:
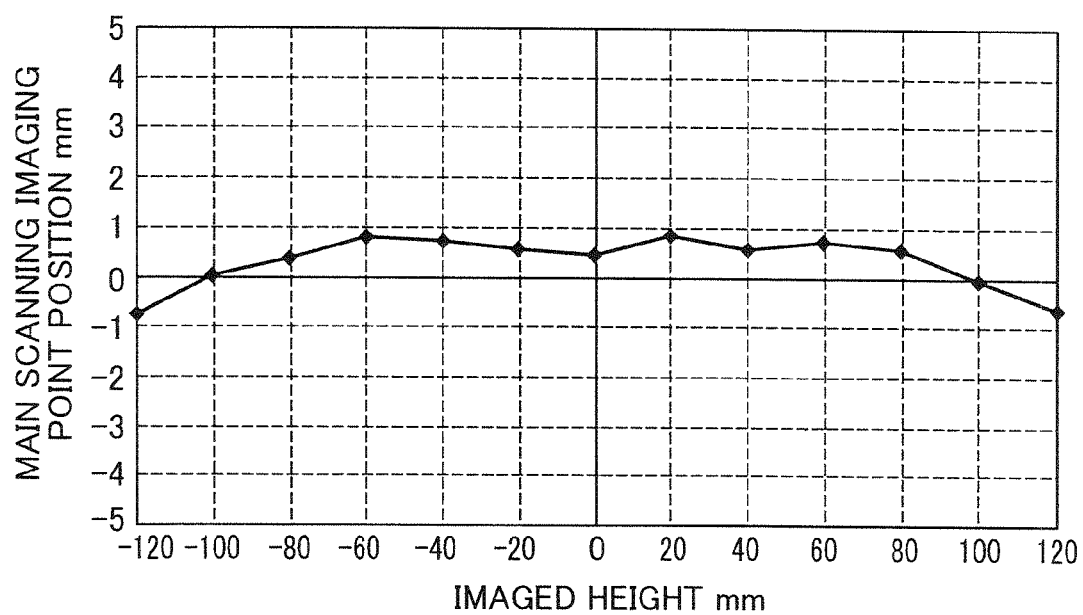
FIG. 8 is a graph showing the optical property (field curvature) of the optical scanning device of the Example.

FIG. 8 is a graph showing the field curvature of the optical scanning device, which has the scanning optical system of the Examples, in the main scanning direction. As evident from FIG. 6, the field curvatures in both the main scanning direction and the sub scanning direction have been inhibited to a low level, and it was confirmed that there are no practical problems.

Example 2

Other than using a cylindrical lens having an optical diffractive surface (diffraction grating) as the cylindrical lens 23, a scanning optical system was prepared by using the same collimator lens 23 and fθ lens 28 as Example 1 shown in Table 1 above. In Example 2, the diffraction grating was disposed on the second face (exit face) of the cylindrical lens. The data of the cylindrical lens and the phase term of the diffraction grating of the cylindrical lens are as per Table 2 below.

TABLE 2

| | Cylindrical Lens Data | | | | |
|---|---|---|---|---|---|
| Face No. | Main Scanning Direction Curvature Radius | Sub Scanning Direction Curvature Radius | Surface Separation | Refractive Index | Glass Type |
| 1 | ∞ | 3.697 | 3.00 | 1.507595 | Z-330R |
| 2 | ∞ | ∞ | 36.39 | | |
| Cylindrical Lens Diffraction Grating Phase Term | | | | | |
| Face No. | C1 | C2 | C3 | | |
| 2 | 8.00E−02 | 1.63E−03 | 0.00 | | |

The shape and inclination of the diffraction grating are represented by the following phase function formula.

$$\phi(x, y) = \frac{2\pi}{\lambda}(C_1 x^2 + C_2 x^4 + C_3 x^6)$$

Note that, in the foregoing formula, C1, C2, C3 are phase polynomial coefficients. Note that the direction of the coordinate axis is as follows; namely, the main scanning direction is y and the sub scanning direction is x.

Figure 9:
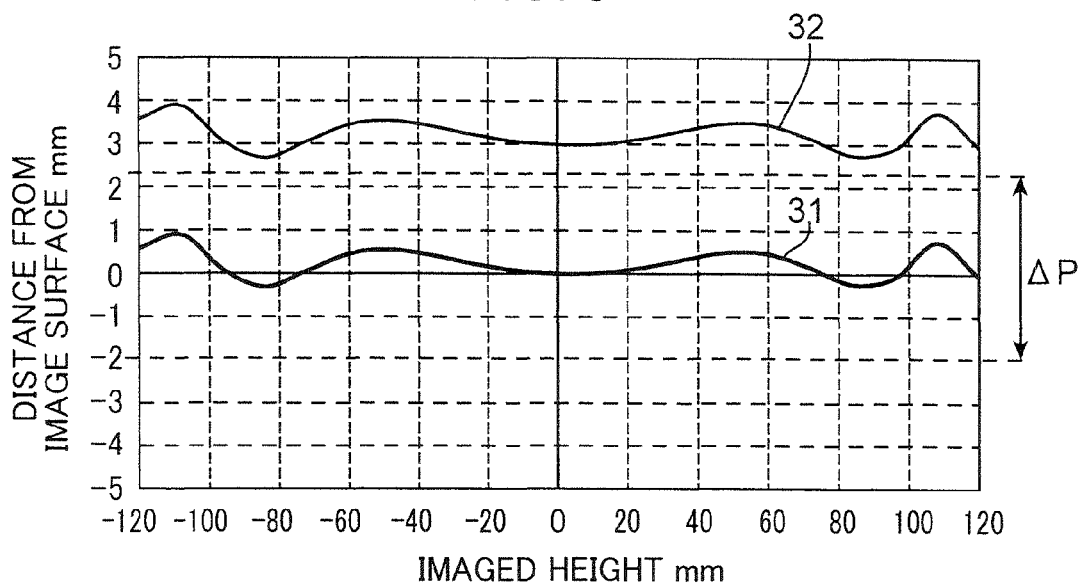
FIG. 9 is a graph showing the field curvature in the sub scanning direction when a cylindrical lens that does not have a diffraction grating is used.
Figure 10:
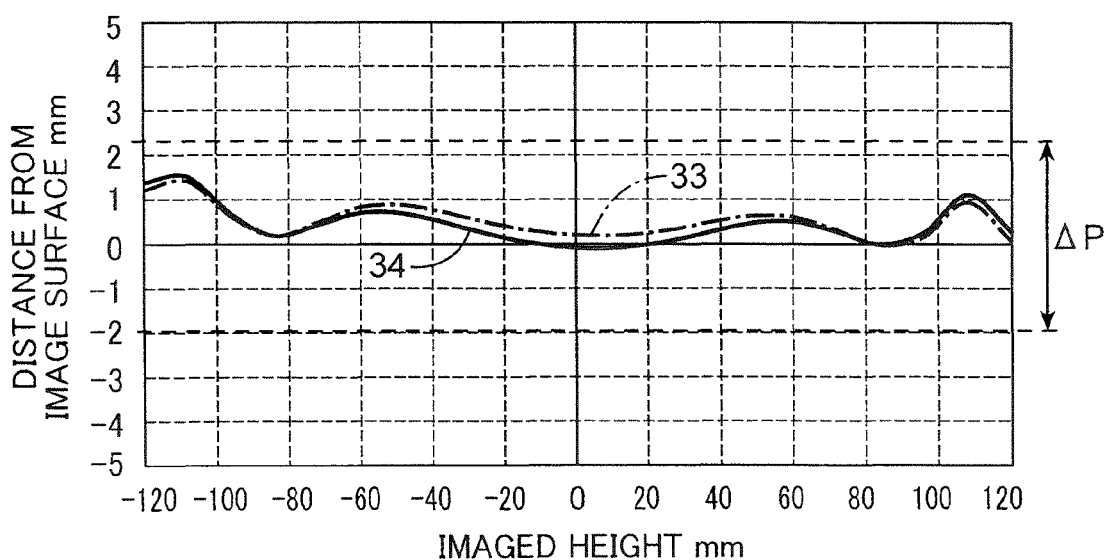
FIG. 10 is a graph showing the field curvature in the sub scanning direction when a cylindrical lens having a diffraction grating is used.

FIG. 9 is a graph for comparison showing the field curvature of the cylindrical lens in the sub scanning direction that does not have a diffraction grating, and FIG. 10 is a graph showing the field curvature of the sub scanning direction in a case of using the cylindrical lens having the diffraction grating of Example 2. In FIG. 9, a curved line 31 shows the field curvature at an ambient temperature of 25° C. and a curved line 32 shows the field curvature at an ambient temperature of 50° C., respectively. Moreover, in FIG. 10, a curved line 33 shows the field curvature at an ambient temperature of 25° C., and a curved line 34 shows the field curvature at an ambient temperature of 50° C.

As shown with the curved lines 31, 33 in FIG. 9 and FIG. 10, at the ambient temperature of 25° C., the field curvature in the sub scanning direction is within the range of the tolerance level ΔP regardless of whether a diffraction grating is formed on the cylindrical lens. Meanwhile, as shown with the curved line 32 of FIG. 9, with a scanning optical system using a cylindrical lens that does not have a diffraction grating, when the ambient temperature rises to 50° C., the field curvature in the sub scanning direction falls outside the range of the tolerance level ΔP. This is considered to be a result of the refractive index of the members (fθ lens 28 and the like) configuring the scanning optical system changing pursuant to the temperature change, and the focal position consequently changing.

Meanwhile, as shown with the curved line 34 of FIG. 10, with a scanning optical system using a cylindrical lens having a diffraction grating, even when the ambient temperature rises to 50° C., there is hardly any change in the field curvature in the sub scanning direction, and the field curvature is within the range of the tolerance level ΔP. This is considered to be a result of the focal position variation associated with the temperature change of the refractive index of the members configuring the scanning optical system being balanced with the focal position variation associated with the shift in the emission wavelength of the semiconductor laser 22 caused by the temperature change, and the focal position variation being consequently inhibited.

According to the optical scanning device 104 of this embodiment explained above, as a result of satisfying Formula (1) above, the thickness of the fθ lens 28 in the optical axis direction does not have to be considerably changed in the main scanning direction, and the fθ lens 28 can be stably molded. Moreover, as shown in FIG. 8, the fθ lens 28 is also superior in terms of the field curvature. Accordingly, it is possible to provide an optical scanning device 104 capable of improving the productivity of the fθ lens 28 and stabilizing the optical performance of the fθ lens 28, and which also yields superior imaging performance.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:
1. An optical scanning device, comprising:
a light source which emits a light beam;
a deflector which reflects and then deflects/scans the light beam emitted from the light source;
an incident optical system which causes the light beam emitted from the light source to enter the deflector; and
one scanning lens which includes a first face facing the deflector and a second face on an opposite side to the first face, and performs imaging of the deflected/scanned light beam on a surface to be scanned, wherein in a main scanning cross section, when an angle relative to an optical axis of an incident light beam which enters the scanning lens from the first face is θin, and an angle relative to an optical axis of an outgoing light beam which is output from the second face toward the surface to be scanned is θout, in an entire scanning region, a condition of $0.9 < \theta in/\theta out < 1.3$ is satisfied.

2. The optical scanning device according to claim 1, wherein when a lens thickness in an optical axis direction at a center of the scanning lens in a main scanning direction is d1, and a lens thickness of an optical axis direction in an end part in a main scanning direction is d2, a condition of $d2 > 0.7 \cdot d1$, provided that $d2 \leq d1$, is satisfied.

3. The optical scanning device according to claim 1, wherein the incident optical system includes a cylindrical lens, and an optical diffractive surface is provided to at least one surface of the cylindrical lens.

4. An image forming apparatus, comprising:

an image carrier which carries an electrostatic latent image; and an optical scanning device which irradiates a light beam, with a peripheral surface of the image carrier being used as the surface to be scanned, the optical scanning device including:

a light source which emits a light beam;

a deflector which reflects and then deflects/scans the light beam emitted from the light source;

an incident optical system which causes the light beam emitted from the light source to enter the deflector; and one scanning lens which includes a first face facing the deflector and a second face on an opposite side to the first face, and performs imaging of the deflected/scanned light beam on a surface to be scanned, wherein in a main scanning cross section, when an angle relative to an optical axis of an incident light beam which enters the scanning lens from the first face is θin, and an angle relative to an optical axis of an outgoing light beam which is output from the second face toward the surface to be scanned is θout, in an entire scanning region, a condition of $0.9 < \theta in/\theta out < 1.3$ is satisfied.

5. The image forming apparatus according to claim 4, wherein when a lens thickness in an optical axis direction at a center of the scanning lens in a main scanning direction is d1, and a lens thickness in an optical axis direction at an end part in a main scanning direction is d2, a condition of $d2 > 0.7 \cdot d1$, provided that $d2 \leq d1$, is satisfied.

6. The image forming apparatus according to claim 4, wherein the incident optical system includes a cylindrical lens, and an optical diffractive surface is provided to at least one surface of the cylindrical lens.

7. A scanning lens built into an optical scanning device having a light source which emits a light beam, a deflector which reflects and then deflects/scans the light beam emitted from the light source, and an incident optical system which causes the light beam emitted from the light source to enter the deflector, the scanning lens comprising:

a first face facing the deflector; and a second face on an opposite side to the first face; wherein the scanning lens has a function of performing imaging of the deflected/scanned light beam on a surface to be scanned, and in a main scanning cross section, when an angle relative to an optical axis of an incident light beam which enters the scanning lens from the first face is θin, and an angle relative to an optical axis of an outgoing light beam which is output from the second face toward the surface to be scanned is θout, in an entire scanning region, a condition of $0.9 < \theta in/\theta out < 1.3$ is satisfied.

8. The scanning lens according to claim 7, wherein when a lens thickness in an optical axis direction at a center of the scanning lens in a main scanning direction is d1, and a lens thickness in an optical axis direction at an end part in a main scanning direction is d2, a condition of $d2 > 0.7 \cdot d1$, provided that $d2 \leq d1$, is satisfied.

* * * * *